(12) United States Patent
Vickers, Jr.

(10) Patent No.: US 6,846,503 B2
(45) Date of Patent: Jan. 25, 2005

(54) METHOD AND APPARATUS FOR PRODUCTION OF AN ALCOHOLIC BEVERAGE

(76) Inventor: Marcus LaDon Vickers, Jr., 132 Pioneer Rd., Ninety Six, SC (US) 29666

(*) Notice: Subject to any disclaimer, the term of this patent is extended or adjusted under 35 U.S.C. 154(b) by 0 days.

(21) Appl. No.: 10/059,581

(22) Filed: Jan. 29, 2002

(65) Prior Publication Data

US 2003/0035856 A1 Feb. 20, 2003

Related U.S. Application Data

(60) Provisional application No. 60/325,771, filed on Apr. 27, 2001.

(51) Int. Cl.[7] .................................................. C12G 3/06
(52) U.S. Cl. ...................................... 426/330.4; 426/592
(58) Field of Search ............................... 426/330.4, 592

(56) References Cited

U.S. PATENT DOCUMENTS

| | | |
|---|---|---|
| 205,443 A | 6/1878 | Thierman |
| 273,604 A | 3/1883 | Fils |
| 754,461 A | 3/1904 | Kouba |
| 1,037,783 A | 9/1912 | Lutters |
| 1,153,992 A | 9/1915 | Woolner, Jr. |
| 1,981,873 A | 11/1934 | Miller |
| 2,061,560 A | 11/1936 | Brown |
| 2,104,304 A | 1/1938 | Kaplan |
| 2,128,760 A | 8/1938 | Shapiro |
| 2,132,435 A | 10/1938 | Reiman |
| 2,198,221 A | 4/1940 | Musher |
| 2,559,129 A | 7/1951 | Miller |
| 2,647,078 A | 7/1953 | Chambers |
| 3,598,607 A | 8/1971 | Morse et al. |
| 3,812,272 A | 5/1974 | Linville |
| 3,988,204 A | 10/1976 | Andreasen et al. |
| 4,001,458 A | 1/1977 | Murolo |
| 4,327,115 A | 4/1982 | Kime |
| 4,345,972 A | 8/1982 | Hannebaum et al. |
| 4,414,231 A | 11/1983 | Ficca |
| 4,440,601 A | 4/1984 | Katz et al. |
| 4,680,179 A | 7/1987 | Lidman |
| 4,738,857 A | 4/1988 | Daher et al. |
| 4,877,772 A | 10/1989 | Mudzhiri et al. |
| 4,900,564 A | 2/1990 | Lee et al. |
| 4,956,194 A | 9/1990 | Gos |
| 5,043,284 A | 8/1991 | Welledits et al. |
| 5,458,739 A | 10/1995 | Boucher et al. |
| 5,618,573 A | 4/1997 | Filippova et al. |
| 6,203,836 B1 | 3/2001 | Gross, III et al. |

OTHER PUBLICATIONS

Irish Mist www.irishmist.com/history.htm.*
Laima, wysiwyg:/54//http://www.angelfire.com/ut/recipes/honey.htm.*
United States Statutory Invention Registration No. H621, Apr. 4, 1989, Gary A. Day, Flavor Modification of Distilled Spirits.

* cited by examiner

*Primary Examiner*—Curtis E. Sherrer
(74) *Attorney, Agent, or Firm*—Craig Weiss; Harry M. Weiss; Weiss, Moy & Harris, PC

(57) ABSTRACT

Disclosed is a method and apparatus for flavoring an ethanolic spirit. A corrosion-resistant container with electric heating elements is used in a distillation process to form an ethanolic spirit. One or more aging enhancers are added to at least a portion of the distillate. A precipitate is allowed to form, removing at least a portion of the aging enhancers. The remaining solution has the enhanced flavor and aroma of an aged spirit.

19 Claims, 5 Drawing Sheets

METHOD AND APPARATUS FOR PRODUCTION OF AN ALCOHOLIC BEVERAGE

CROSS-REFERENCE TO RELATED APPLICATION

This application claims priority of U.S. Provisional Application No. 60/325,771, filed Apr. 27, 2001, entitled: Method and Apparatus for Whiskey Distillation by Marcus LaDon Vickers, Sr.

TECHNICAL FIELD

The invention relates generally to the production of alcoholic beverages and, more particularly, to a method and apparatus for expediting the production of aged alcoholic spirits.

BACKGROUND OF THE INVENTION

Many alcoholic beverages are produced using multiple-step processes comprising one or more of the steps of (1) producing ethanol by fermentation of sugars, grains, juices, or other produce; (2) distilling the product of fermentation to produce ethanolic spirits; and (3) aging the ethanolic spirits until the beverage possesses desirable flavor, aroma, and color characteristics. Historically, this third step, the aging process, involved storing the ethanolic spirit in wooden casks or barrels. Changes in the flavor, aroma, and color of the ethanolic spirit during the aging process occur as a result of the chemical interaction of the ethanol, water, and essential oils in the spirit, with each other and with additional flavoring agents that are absorbed from the wood of the container. This process may take weeks, months, or years. Beverages produced in this manner include Scotch, Irish, bourbon, rye, Canadian, and Australian whiskeys, rum, brandy, armagnac, cognac, many wines, and the like.

Of particular interest are whiskeys, which require years of maturation to achieve desirable characteristics. Many attempts have been made to find a suitable way to reduce the aging time required to produce whiskey, without changing the characteristics of the final product. None of the methods yet attempted for reducing the aging time of whiskey have solved the problem without changing the composition of the final product by adding undesirable agents or removing desirable ones. Thus, there exists a continuing need to find an alternative to the historical aging technique, requiring a shorter time, yet producing a beverage with desirable flavor, aroma, and color characteristics.

SUMMARY OF THE INVENTION

The invention relates to a method for producing a beverage from an ethanolic spirit, comprising the step of adding one or more aging enhancers to the ethanolic spirit.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
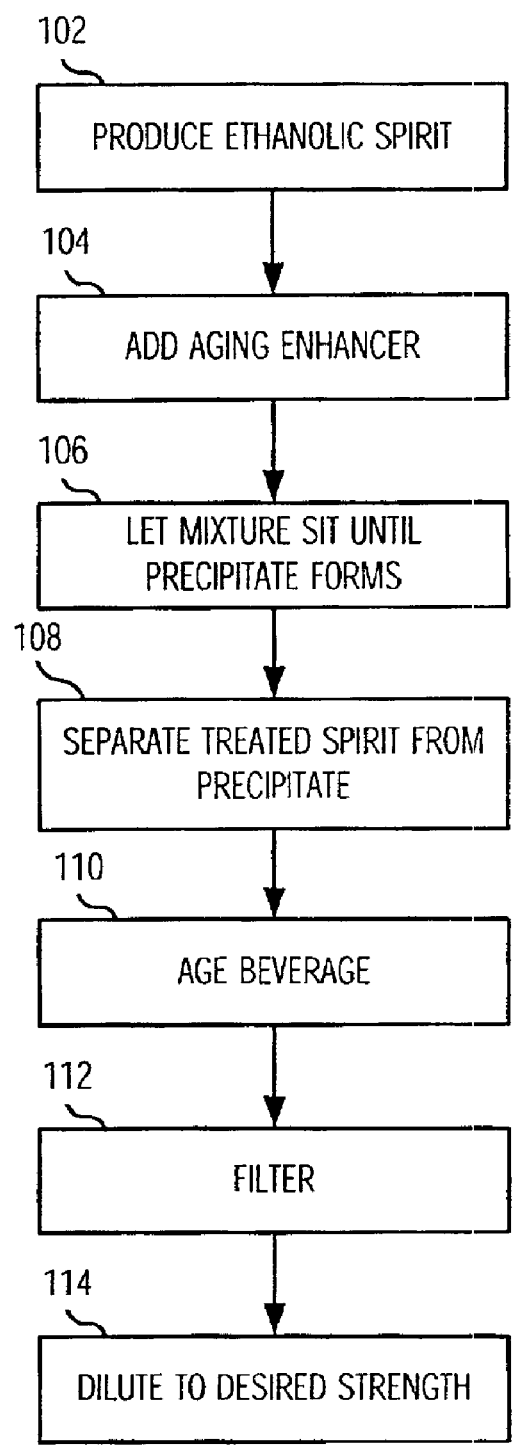
FIG. 1 is a flow chart showing steps for producing an ethanolic beverage.

Shown in FIG. 1 is a flow chart illustrating basic steps that may be performed to reduce the time necessary to produce an aged ethanolic spirit, such as whiskey, for example. In step 102, an ethanolic spirit is produced. In step 104, aging enhancers are introduced into the ethanolic spirit. As shown in step 106, the ethanolic spirit preferably remains in contact with the aging enhancers until a precipitate forms, which is expected to be within thirty to sixty days, typically. However, it will be appreciated that such precipitation may result in other time frames, depending upon the type and concentration of ethanolic spirit, the composition and temperature of the aging enhancers, and other parameters. In step 108, the ethanolic spirit is preferably separated from the precipitate.

In step 110, the ethanolic spirit is preferably aged in a wooden container for approximately eighteen months to three years. After completing the aging process, the ethanolic spirit is preferably filtered in step 112 to remove solids introduced during the aging process. Finally, in step 114, the aged ethanolic spirit is preferably "cut" to the desired alcohol concentration by dilution with water. The final concentration of the ethanolic beverage is preferably between 80 and 90 proof (40 to 45% alcohol), although a higher or lower concentration may be used if desired.

Figure 2:
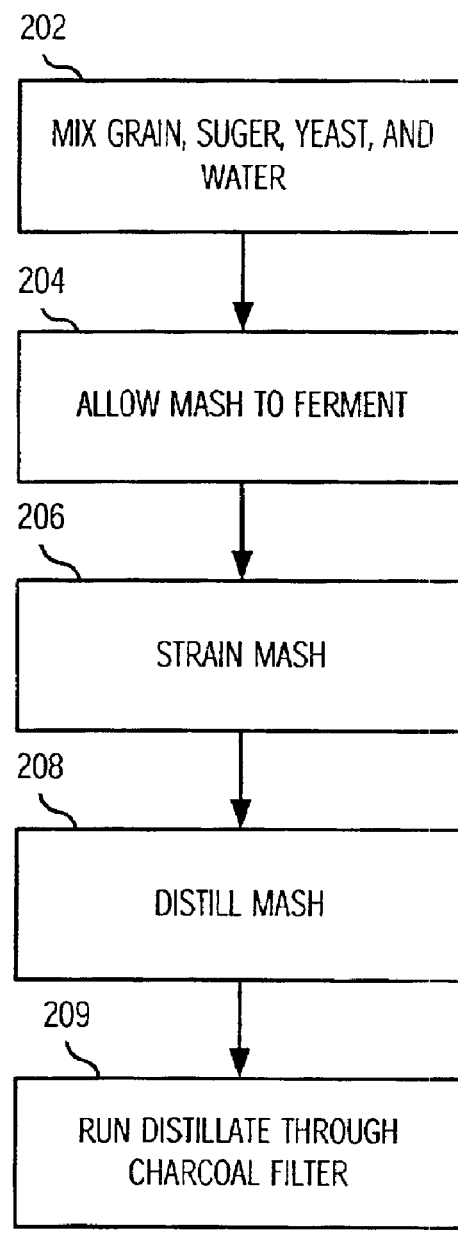
FIG. 2 is a flow chart showing steps for producing an ethanolic beverage.
Figure 2A:
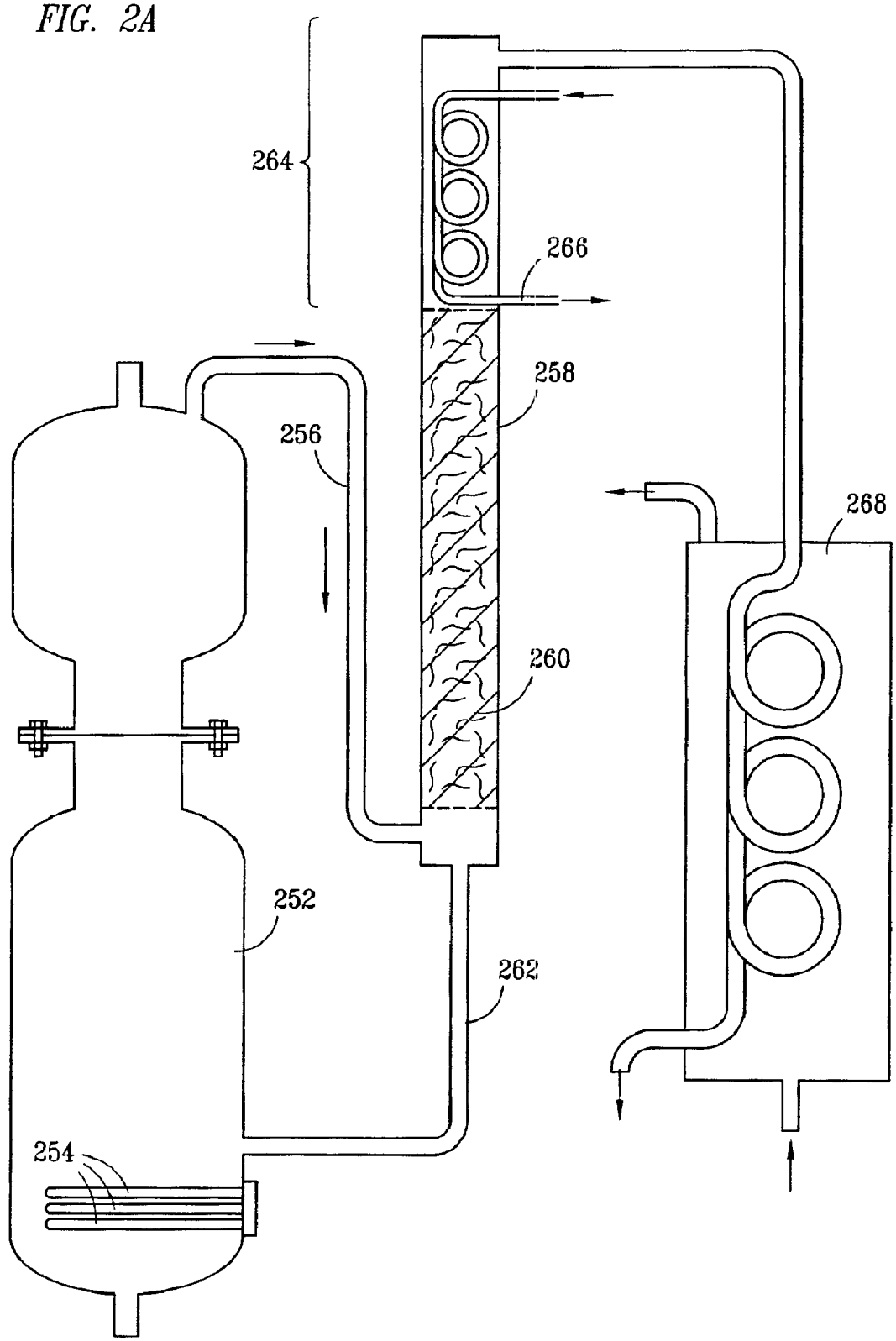
FIG. 2A is a schematic diagram illustrating an apparatus for producing an ethanolic beverage.

FIG. 2 shows steps preferably performed in production of an ethanolic spirit, such as in step 102 of the process depicted in FIG. 1. While the present invention is preferably practiced using an ethanolic spirit produced according to the process shown in FIG. 2, any ethanol-rich spirit may be used that is safe for human consumption. Such ethanolic spirits include but are not limited to the ethanolic spirits used to make whiskeys, including Scotch, Irish, bourbon, rye, Canadian, and Australian whiskeys; rum; vodka; brandy; armagnac; cognac; wine; and the like.

In step 202, raw ingredients are mixed to form what is referred to in the art as the "mash." The mash preferably comprises: a grain, preferably course ground corn; sugar, preferably cane sugar; water; and yeast, preferably FLEISCHMANN'S® dry yeast, although other yeasts may be used and many are well-known in the prior art. The preferred ratio of ingredients is 1 lb corn and 2 lb sugar per gallon of water, and 1 tablespoon yeast for every 50 gallons of water.

In step 204, after the ingredients are mixed, the mash is allowed to ferment. To facilitate fermentation, the mash is preferably maintained at a temperature between approximately 90 to 95 degrees Fahrenheit for a period preferably between approximately five to seven days. During this time, the yeast converts the sugar to alcohol. In step 206, after substantially all of the sugar is consumed, the mash is preferably strained through a fine strainer. The strainer is used to remove solids from the mash.

In step 208, the ethanolic spirit is distilled from the mash. FIG. 2B depicts an apparatus that may be used in the distillation process of step 208. The strained mash (not shown) is heated in a cooker 252 until boiling, which should occur at a temperature between approximately 192 to 196 degrees Fahrenheit. The mash is heated, preferably using electric heating elements 254 positioned inside the cooker 252. Use of electric heating elements reduces the likelihood of scorching. However, any heating method may be used that is effective for heating the mash to a temperature of at least approximately 192 degrees Fahrenheit. The cooker 252 is preferably constructed of stainless steel. Stainless steel is easier to clean than copper, which has traditionally been used to make cookers.

Steam (not shown) exits the cooker 252 through an overhead conduit 256 leading to one or more distillation columns 258. The interior of the one or more distillation coulombs 258 preferably contains a corrosion-resistant packing 260, such as stainless steel wool, which collects entrained liquids (not shown) from the steam. The collected liquid exits the column 258 through a bottoms conduit 262 leading back to the cooker 252.

The top of the distillation column 264 is maintained at a temperature preferably between approximately 172 to 176 degrees Fahrenheit. The temperature is preferably maintained by circulating cooling water (not shown) through a coil of metal tubing 266 positioned inside of the column 258, near its top 264. When the temperature at the top of the column is preferably maintained between 172 to 176 degrees Fahrenheit, much of the water vapor (not shown) present in the steam condenses into a water-rich liquid (not shown). The water-rich liquid passes through the bottoms conduit 262 to the cooker 252. The remaining steam then passes from the top of the column 258 to a condenser 268, where it is condensed into an ethanol-rich liquid (not shown). The alcohol content of the ethanol-rich liquid leaving the condenser 268 is preferably between approximately 160 and 185 proof (80 to 92.5% alcohol).

In step 209, the ethanol-rich liquid is preferably filtered to remove any impurities and the "moonshine" smell. A preferred filter is a charcoal filter, such as that found in a charcoal water purification system. However, any filter may be used which is effective for removing unwanted impurities while leaving a substantial portion of the necessary flavoring agents.

Figure 3:
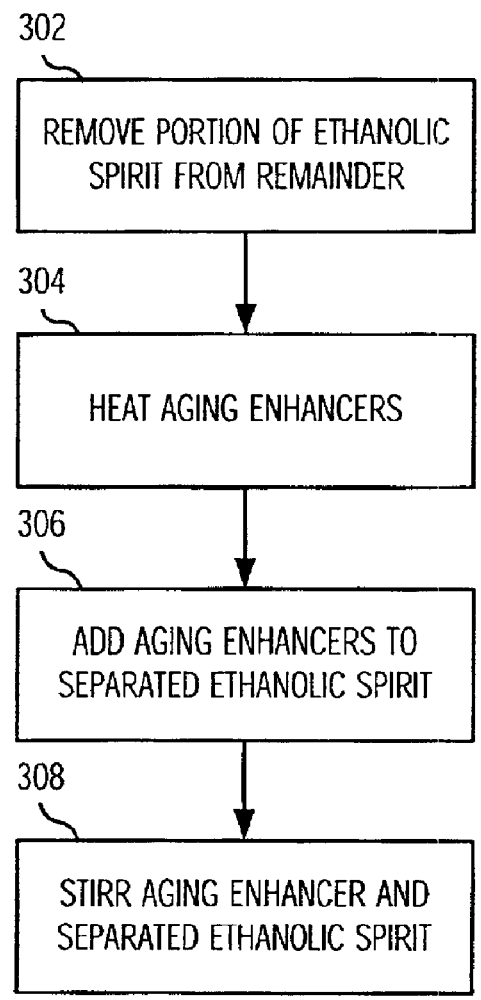
FIG. 3 is a flow chart showing steps for adding aging enhancers to an ethanolic spirit.

FIG. 3 illustrates steps that are preferably taken in step 104 of FIG. 1 to add the aging enhancers to the ethanolic spirit. In step 302, a portion of the ethanolic spirit is separated from the remainder of the ethanolic spirit. The aging enhancers are preferably added to only a portion of the ethanolic spirit, rather than the entire batch, because this will facilitate the subsequent separation of the precipitate from the ethanolic spirit, as described in step 108 of FIG. 1. The separated portion is preferably about 0.75 gal per 50 gallons total of ethanolic spirit. However, any size of separated portion may be used which is large enough to facilitate dilution of the aging enhancers in the separated portion of the ethanolic spirit. After the separated portion has been removed, the remaining ethanolic spirit may proceed to the aging process described in step 110 of FIG. 1.

The aging enhancers comprise one or a combination of a variety of sugar-rich syrups, such as natural or artificial honey, natural or artificial syrup, or the like. The aging enhancers preferably comprise flavor or aroma enhancing constituents that enhance the aged characteristics of the ethanolic spirit. Preferably, both honey and maple syrup are used as aging enhancers, and are added in relative amounts of about 6 to 18 oz. honey and about 2 to 6 oz. maple syrup per 50 gal. of 160 proof total ethanolic spirit, including any separated portion as well as the remainder of the ethanolic spirit. Most preferably, about 12 oz. honey and about 4 oz. maple syrup per 50 gal. total ethanolic spirit is used. The honey used is preferably pure honey, with substantially no wax, and may be selected from any type of honey, including sunflower honey, buckwheat honey, clover honey, and the like, as well as blends of these honeys. The syrup used is preferably pure maple syrup.

In step 304, the aging enhancers are preferably heated to a temperature near their boiling point before being introduced into the separated portion of the ethanolic spirit. Heating the aging enhancers is not required, but allows the aging enhancers to pour easier and mix more thoroughly into the ethanolic spirit. After heating, the aging enhancers are introduced into the separated portion of ethanolic spirit in step 306. In step 308, the aging enhancers and ethanolic spirit are then preferably stirred together until substantially completely dissolved in a solution. The aging enhancers are preferably added to ethanolic spirit that is at least about 140 proof (70 percent alcohol) and, more preferably, is at least about 160 proof (80 percent alcohol).

While the steps shown in FIG. 3 describe a convenient and effective way of introducing the aging enhancers into the ethanolic spirit, other methods may also be used. For example, the aging enhancers may be added directly into the entire batch of ethanolic spirit, rather than into a smaller, separated portion. However, if the aging enhancers are added directly into a wooden barrel, they may cause the barrel to leak. The aging enhancers may be added separately into the ethanolic spirit, or may be mixed together before introduction into the ethanolic spirit. Alternatively to heating the aging enhancers before introduction into the ethanolic spirit, the aging enhancers may be introduced without heating, or the ethanolic spirit may be heated, either before or after introduction of the aging enhancer. Generally, any method of introduction of the aging enhancers may be used; however, it is preferable to utilize a method that is effective for allowing substantially thorough contact between the aging enhancers and at least about one percent of the total ethanolic spirit, including any separated portions as well as the remainder.

Referring again to FIG. 1, in step 106, the aging enhancers are preferably allowed to react with the ethanolic spirit until a precipitate forms in the mixture. The precipitate may look powdery and be a grayish-white color. A period of about thirty to sixty days is generally required before the precipitate forms. Heating the aging enhancers before addition to the ethanolic spirit and stirring the mixture may result in faster reaction and a shorter necessary contact period.

In step 108, the ethanolic spirit is preferably separated from the precipitate. If the aging enhancers were added to a separated portion of the ethanolic spirit according to the steps shown in FIG. 3, then the separation may be easily accomplished by siphoning the ethanolic spirit from the container. In that case, the separated portion of ethanolic spirit is then added back into the remainder of the ethanolic spirit after separation from the precipitate. The ethanolic spirit may alternatively be separated from the precipitate by other separation methods, such as centrifugal separation, filtration, and the like. Generally, any method of separation may be used that is effective for separating the mixture into two or more portions, at least one of which contains substantially all of the ethanolic spirit and little or none of the precipitate. After the precipitate has been substantially separated from the ethanolic spirit, any sweetness added by the aging enhancers is reduced to a level virtually indiscernible to most consumers. Nevertheless, at least a portion of the flavor or aroma enhancing constituents of the aging enhancers remain in the ethanolic spirit. The ethanolic spirit finally produced will taste "smoother" and more "aged" than if the aging enhancers had not been added.

Although the aging enhancers will improve the flavor and aroma characteristics of the ethanolic spirit even without any further aging, further superior qualities will be obtained in the final product if the ethanolic spirit is aged for at least some additional period of time after the precipitate is removed. Therefore, in step 110 of FIG. 1, the ethanolic spirit is preferably aged in a wooden cask or barrel. The preferred method of aging is according to the steps shown in FIG. 4, discussed below. However, many aging methods are known in the art, and any method may be used in connection with the present invention.

Figure 4:
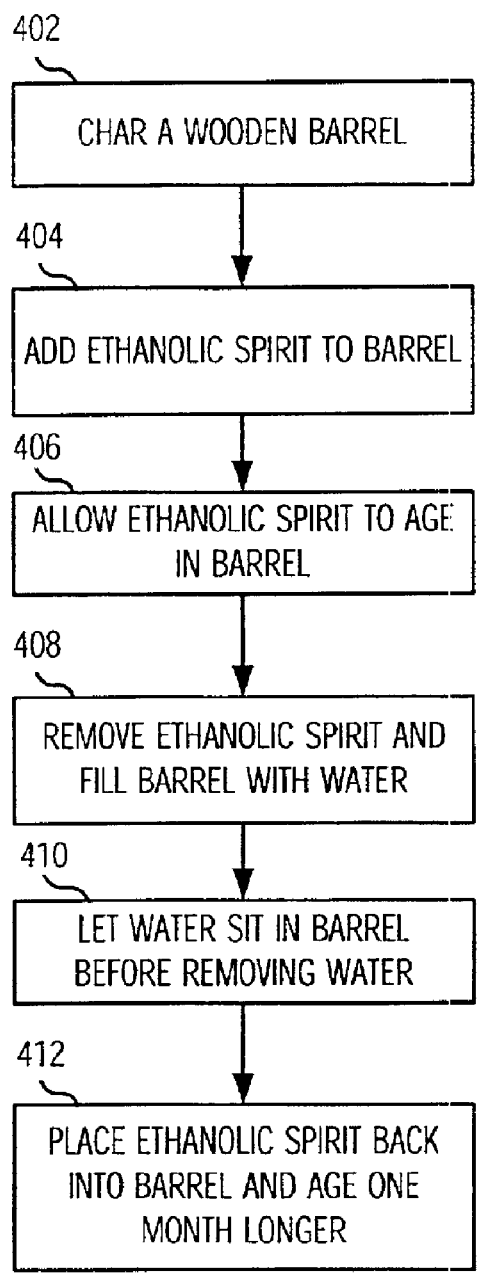
FIG. 4 is a flow chart showing steps for an aging process for an ethanolic spirit.

FIG. 4 is a flow chart showing steps that are preferably performed in connection with the aging process of step 110 of FIG. 1. In step 402, preferably a new, wooden barrel is "charred," preferably by slightly burning the inside surfaces of the barrel with a flame. This charring process is well known in the art. The barrel is preferably made of white oak. In step 404, the ethanolic spirit is added to the barrel.

Alternatively, an old charred barrel may be re-used, in which case the ethanolic spirit should be diluted with water to about 120 proof. In this case, it is preferable, though not required, to add about 5 lb of cured white oak chips per 50 gal. ethanolic spirit to the barrel. The process of producing the cured white oak chips is well known in the art.

In another embodiment of the invention, if the aging enhancers are introduced into only a portion of the ethanolic spirit, the remainder of the ethanolic spirit may be placed immediately into an aging barrel to begin aging. The separated portion of the ethanolic spirit is then added to the barrel later, after the undissolved portion of the aging enhancers has been removed. This allows a "head start" on the aging process, without affecting the desirable characteristics of the final product.

In step 406, the ethanolic spirit is allowed to age in the barrel for a period of time determined by the type of ethanolic spirit used and by individual taste. For an ethanolic spirit produced according to the steps shown in FIG. 2 or other similar ethanolic spirits, a preferred aging period is at least about one year, and more preferably is between about one and one-half to three years. A shorter aging period may be used, but may result in less favorable characteristics. Aging periods of more than three years may be used, and may result in further superior flavor, aroma, and appearance characteristics.

In step 408, when the ethanolic spirit has aged for about one month less than the desired total aging period, it is preferably removed from the wooden barrel, which is then filled with water. In step 410, the water is preferably allowed to sit in the barrel for about one week and is then removed from the barrel. In step 412, the ethanolic spirit is then placed back into the barrel, where it is preferably aged for an additional period of about one month. Alternatively to step 410, the ethanolic spirit may be transferred directly from its original barrel to a second barrel which has previously been similarly rinsed with water.

Referring again to FIG. 1, the aged ethanolic spirit is preferably filtered in step 112 to remove substantially all of the cured white oak chips and substantially all of the char particles. This may be accomplished using a fine paper filter, or any other filter which is fine enough to filter out substantially all of the char and oak chips. In step 114, the filtered ethanolic spirit is cut to the desired strength by dilution with water. The alcohol concentration of the final product is preferably between about 80 to 90 proof (40 to 45% alcohol). Once cut to the desired concentration, the beverage is ready for packaging and consumption.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features.

Many such variations and modifications may be considered obvious and desirable by those skilled in the art based upon a review of the foregoing description of preferred embodiments. For instance, the preferred embodiment of the invention is described as a batch process; however, it is recognized that the method of the present invention could easily be adapted to a continuous-flow process. Accordingly, it is appropriate that the appended claims be construed broadly and in a manner consistent with the scope of the invention.

What is claimed is:

1. A method for producing an ethanolic spirit beverage comprising the steps of:
   adding one or more aging enhancers to at least a portion of an ethanolic spirit, the one or more aging enhancers selected from the group consisting of honey and maple syrup, the one or more aging enhancers comprising 6 to 18 oz. of honey per 50 gallons total of 140 to 185 proof ethanolic spirit and 4 to 12 oz. of maple syrup per 50 gallons total of 140 to 185 proof ethanolic spirit; and
   separating a precipitate from the ethanolic spirit after a period of time and reducing any sweetness of the beverage added by the aging enhancers.

2. The method of claim 1 wherein the one or more aging enhancers comprises maple syrup.

3. The method of claim 1 wherein the ethanolic spirit comprises a whiskey.

4. A method for producing an ethanolic spirit beverage, comprising the steps of:
   adding one or more aging enhancers to at least a portion of an ethanolic spirit, the one or more aging enhancers comprising a sugar-rich syrup, the one or more aging enhancers comprising 6 to 18 oz. of honey per 50 gallons total of 140 to 185 proof ethanolic spirit and 4 to 12 oz. of maple syrup per 50 gallons total of 140 to 185 proof ethanolic spirit;
   allowing the one or more aging enhancers to remain in contact with the ethanolic spirit until a precipitate forms in the ethanolic spirit; and
   separating a portion of the precipitate from the ethanolic spirit after the precipitate has formed and reducing any sweetness of the beverage added by the aging enhancers.

5. The method of claim 4 further comprising the step of aging the ethanolic spirit by storing it in a wooden container after separating a portion of the precipitate from the ethanolic spirit.

6. The method of claim 5 wherein the ethanolic spirit is aged in the wooden container for a period of at least one year.

7. A method for producing an ethanolic spirit beverage, comprising the steps of:
   separating a portion of an ethanolic spirit leaving a remainder of the ethanolic spirit;
   adding one or more aging enhancers to the separated portion of the ethanolic spirit, the one or more aging enhancers comprising a sugar-rich syrup, the one or more aging enhancers comprising 6 to 18 oz. of honey per 50 gallons total of 140 to 185 proof ethanolic spirit and 4to 12 oz. of maple syrup per 50 gallons total of 140 to 185 proof ethanolic spirit;

allowing the one or more aging enhancers to remain in contact with the separated portion of the ethanolic spirit until a precipitate forms in the ethanolic spirit;

separating a portion of the precipitate from the separated portion of the ethanolic spirit after the precipitate has formed and reducing any sweetness of the beverage added by the aging enhancers; and combining the separated portion of the ethanolic spirit with the remainder of the ethanolic spirit.

8. The method of claim 7 wherein the volume of the separated portion of the ethanolic spirit is sufficient to facilitate dilution of the one or more aging enhancers in the separated portion of the ethanolic spirit.

9. The method of claim 7 wherein the separated portion of ethanolic spirit is at least one percent of the total quantity of ethanolic spirit to be treated.

10. A method for producing an ethanolic beverage, comprising the steps of:

fermenting a mixture comprising corn, sugar, yeast, and water;

distilling the products of fermentation to produce an ethanolic spirit;

adding one or more aging enhancers to at least a portion of the ethanolic spirit, the one or more aging enhancers selected from the group consisting of honey and maple syrup, the one or more aging enhancers comprising 6 to 18 oz. of honey per 50 gallons total of 140 to 185 proof ethanolic spirit and 4 to 12oz. of maple syrup per 50 gallons total of 140 to 185 proof ethanolic spirit;

allowing the aging enhancers to remain in contact with the ethanolic spirit until a precipitate forms in the mixture; and separating the precipitate from the ethanolic spirit and reducing any sweetness of the beverage added by the aging enhancers.

11. The method of claim 10 further comprising the step of aging the ethanolic spirit by storing it in a wooden container for a period of at least one year.

12. The method of claim 11 wherein the ethanolic spirit is aged for a period of at least one year but less than two years.

13. The method of claim 10 wherein the one or more aging enhancers comprise honey and maple syrup.

14. A method for producing an ethanolic spirit beverage, comprising the steps of:

adding one or more aging enhancers to at least a portion of an ethanolic spirit having an alcohol concentration of at least 140 proof, the one or more aging enhancers comprising a sugar-rich syrup, the one or more aging enhancers comprising 6 to 18 oz. of honey per 50 gallons total of 140 to 185 proof ethanolic spirit and 4 to 12 oz. of maple syrup per 50 gallons total of 140 to 185 proof ethanolic spirit;

allowing the one or more aging enhancers to remain in contact with the ethanolic spirit until a precipitate forms in the ethanolic spirit; and separating and removing a portion of the precipitate from the ethanolic spirit after a precipitate has formed and reducing any sweetness of the beverage added by the aging enhancers.

15. A method for producing an ethanolic spirit beverage, comprising the steps of:

adding one or more aging enhancers to at least a portion of an ethanolic spirit, the one or more aging enhancers comprising maple syrup, the one or more aging enhancers comprising 6 to 18 oz. of honey per 50 gallons 140 to 185 proof ethanolic spirit and 4 to 12 oz. of maple syrup per 50 gallons total of 140 to 185 proof ethanolic spirit;

allowing the one or more aging enhancers to remain in contact with the ethanolic spirit until a precipitate forms in the ethanolic spirit; and separating and removing a portion of the precipitate from the ethanolic spirit after a precipitate has formed and reducing any sweetness of the beverage added by the aging enhancers.

16. The method of claim 2 wherein the one or more aging enhancers further comprises honey.

17. The method of claim 15 wherein the one or more aging enhancers further comprises honey.

18. The method of claim 1 wherein the period of time for forming a precipitate is thirty to sixty days.

19. The method of claim 18 wherein the period of time for forming a precipitate is shortened when the aging enhancers are heated before addition to the ethanolic spirit and a mixture of the aging enhancers and the ethanolic spirit are stirred.

* * * * *